Dec. 15, 1925.
R. D. GIVEN ET AL
1,566,086
ELECTRIC MOTOR CONTROL SYSTEM
Filed Sept. 5, 1923    2 Sheets-Sheet 1
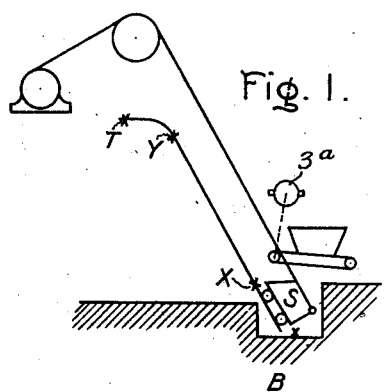
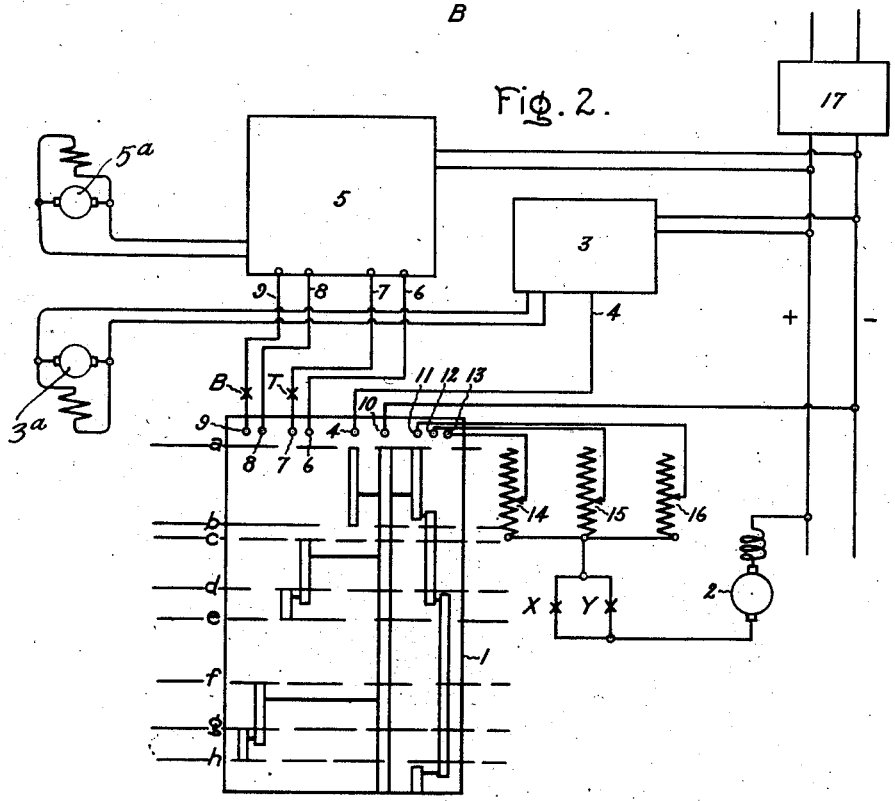
Inventors:
Hugh W.C. Liddiard,
Ralph David Given,
by
Their Attorney.

Dec. 15, 1925.

R. D. GIVEN ET AL

ELECTRIC MOTOR CONTROL SYSTEM

Filed Sept. 5, 1923

Inventors:
Hugh W. C. Liddiard,
Ralph David Given,
by
Their Attorney.

Patented Dec. 15, 1925.

1,566,086

UNITED STATES PATENT OFFICE.

RALPH DAVID GIVEN, OF LEAMINGTON, AND HUGH WILLIAM CONWAY LIDDIARD, OF RUGBY, ENGLAND, ASSIGNORS TO GENERAL ELECTRIC COMPANY, A CORPORATION OF NEW YORK.

ELECTRIC-MOTOR-CONTROL SYSTEM.

Application filed September 5, 1923. Serial No. 661,006.

*To all whom it may concern:*

Be it known that we, RALPH DAVID GIVEN and HUGH W. C. LIDDIARD, subjects of the King of Great Britain, residing, respectively, at Leamington and at Rugby, in the county of Warwick, have invented certain new and useful Improvements in Electric-Motor-Control Systems, of which the following is a specification.

This invention relates to systems of electric motor control and more particularly to systems in which a number of operations have to be performed in a predetermined sequence and when each of the operations has to be completed or at least reach a definite stage before the next operation is commenced.

Examples of this type of system are to be found in the operation of a skip hoist for charging a hopper, and in arrangements for filling railway wagons when run into sidings consisting of parallel tracks. In the case of the skip, the skip has to be filled, hoisted to the top of the hopper, then tilted so as to empty the contents into the hopper, the tilting operation requiring a definite time, and finally the empty skip is righted and lowered to the filling position.

It is often desirable that such a sequence of operations should be carried out automatically, and that in the event of a stoppage for any reason, on recommencing operations the sequence should be continued from the same point as it left off. For example, in the case of the skip hoist, should a stoppage occur just after the skip has been filled, on starting again it is essential that the operation should commence at hoisting. Should this not be so, it is possible that the full skip may be still further charged with material. Similarly, should the hoisting motion have been started when the stoppage occurs, it is essential that hoisting be recommenced as otherwise it is possible that the full skip may be lowered.

If each operation is to be controlled on a time basis, that is, each of the operations is to run for a certain time before the next one is commenced, the simplest arrangement is to use a master controller which is motor operated and runs at a definite speed, and arranged so that in one complete revolution the required sequence of operations is carried out, contacts being provided on the controller in such a form and in such lengths that each operation is performed in its correct sequence and is carried on for the correct time.

It is to be understood that these contacts are used to start automatic gear for starting the various motors or other apparatus used to perform the various operations. In many cases, however, such as that of the skip hoist, it would be difficult, if not impossible, to control all the various operations entirely on a time basis, and if an attempt were made to do this it would soon be found that the steps of the controller would fail to synchronize with the operations required. Thus, if the time for hoisting the skip did not correspond exactly with that actually required, it would be found that either the skip would not reach the top or else it would overwind and be carried past the stopping point. Even were it possible to get synchronism under a certain set of conditions, a very slight change in load or condition of tract, or some similar trouble, would destroy the synchronism.

The object of the present invention is to overcome these difficulties, and whereas the principle of operation is similar to that described above, any of the particular operations can be made to depend entirely on a time basis, but the operation of the controller is actually synchronized at the end of each cycle with the steps to be performed in the cycle, and if necessary any one of the operations can be controlled on a space or other basis. For example, the skip can be stopped by limit switches on the tract and the length of tract can be made independent of the lengths of segments on the controller.

The accompanying drawings diagrammatically illustrate two forms of the invention. In the drawings—

Fig. 1 shows the general arrangement of a skip hoist,

Fig. 2 is a diagram of connections for the arrangement shown in Fig. 1,

Figure 3:
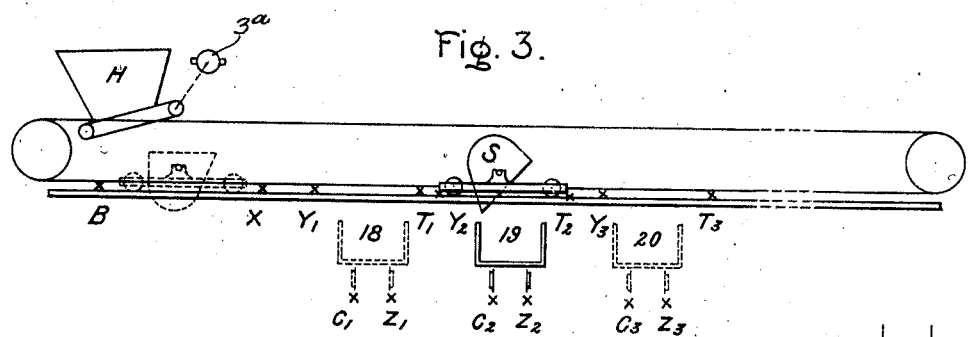
Fig. 3 shows the general arrangement of a scheme for filling railway wagons when run into sidings consisting of parallel tracks.

Referring first to Fig. 2, 1 represents a master controller driven from a small pilot motor 2, which may be controlled either directly as shown or by means of contactor gear which in turn is controlled by means of the controller 1. 3 represents automatic gear for controlling the motor $3_a$ for operating apparatus for filling the skips, Fig. 1, the operation of filling being continued so long as a circuit is made between a control lead 4 and the negative main. Automatic gear for controlling the hoist motor $5_a$ is represented by 5 and four control leads 6, 7, 8 and 9 are provided, lead 6 being for hoisting purposes, lead 7 for electric braking during hoisting, lead 8 for lowering purposes, and lead 9 for electric braking during lowering.

T and B represent limit switches on the track, as shown in Fig. 1, and are arranged to open the respective control circuits and bring into operation mechanical brakes which bring the skip to rest at its top and bottom positions.

10 represents a control lead connecting the controller 1 to the negative main, and 11, 12 and 13 represent control leads in the circuit of motor 2 through adjustable rheostats 16, 15 and 14 respectively. These rheostats can be adjusted to vary the speed of motor 2 and hence that of the controller. Thus the controller is made to run at varying speeds according to the operation being performed.

Switches X, Y on the track are connected in the circuit of motor 2, which cannot run unless one of these switches is closed.

On connecting to the supply mains, supposing that the skip is in the bottom position and empty, the motor 2 will start running at a speed corresponding to the setting of rheostat 16 and the controller will commence to rotate at a corresponding speed.

While the controller is in position $a$, the leads 4 and 10 will be connected and the filling operations will commence and continue until the controller has rotated to such an extent that the contact is broken at position $b$. Just before the end of this period the connection to motor 2 is changed from lead 11 to lead 12 and there is a corresponding change in the speed of the controller to suit the hoisting conditions. On the controller being rotated until the position $c$ reaches the contact fingers, hoisting will commence and will continue so long as the finger connected to lead 6 is in contact with the corresponding controller segment.

The skip will commence to rise and after a short time will reach the limit switch X, which will be opened thereby (the switch Y already being in the open position) and the rotation of the controller is thus stopped. Hoisting is continued, and the skip can be made to move any required distance, the controller meanwhile remaining stationary.

When switch Y is reached, a circuit is completed through this switch to motor 2 and the controller will recommence to rotate. Hoisting will continue until point $d$ on the controller reaches the contact fingers, when electric breaking will commence. This will slow down the skip and when it reaches the limit switch T power is cut off and mechanical brakes applied to bring the skip to a standstill.

In the arrangement shown in Fig. 1, this position is made to correspond to a tipping position, that is, the skip is hauled up so as to tip the material into a hopper, or other receptacle. The length of time required for emptying the skip depends entirely upon the material used and the proportions of the skip, so that this operation can be controlled on a time basis, and it is arranged so that by the time the position $f$ on the controller reaches the contact fingers the skip has emptied itself. When the position $f$ has been reached contact is made to lead 8 and the skip will commence to lower. It is to be noted that although the limit switch T cuts off power for hoisting it does not affect the lowering circuits.

The operation of lowering is very similar to that of hoisting. When the skip reaches the limit switch Y the controller is stopped but lowering is continued until switch X is reached, when the controller is started again and braking and stopping brought about as before. The controller still continues to rotate and after a complete revolution is made, the cycle is recommenced, the operations being performed in exactly the same sequence and in the same way as has just been described, this going on indefinitely so long as power is supplied to the mains.

The speeds of the controller during the tipping and lowering periods can be altered by means of the rheostat 14, the circuit being made to motor 2 through lead 13. Should power be cut off either due to failure of supply or due to the protective devices operating, (these protective devices being made to take care of any contingency such as accidental overload or any other condition requiring immediate stoppage) a circuit breaker 17 is opened automatically, thus cutting off all power from the mains. The motor 2 will therefore stop and the controller will remain stationary, and will not start again until power is re-established to the mains. Thus when power is re-established the cycle of operation will recommence at exactly the same point as was reached at the time of shut down. For example, if the skip were only partly filled when shut down occurred, on re-starting filling would continue so that the total time, namely, the time of filling before shut down plus that continued after shut down, would be equal to the normal time of killing per cycle.

Figure 4:
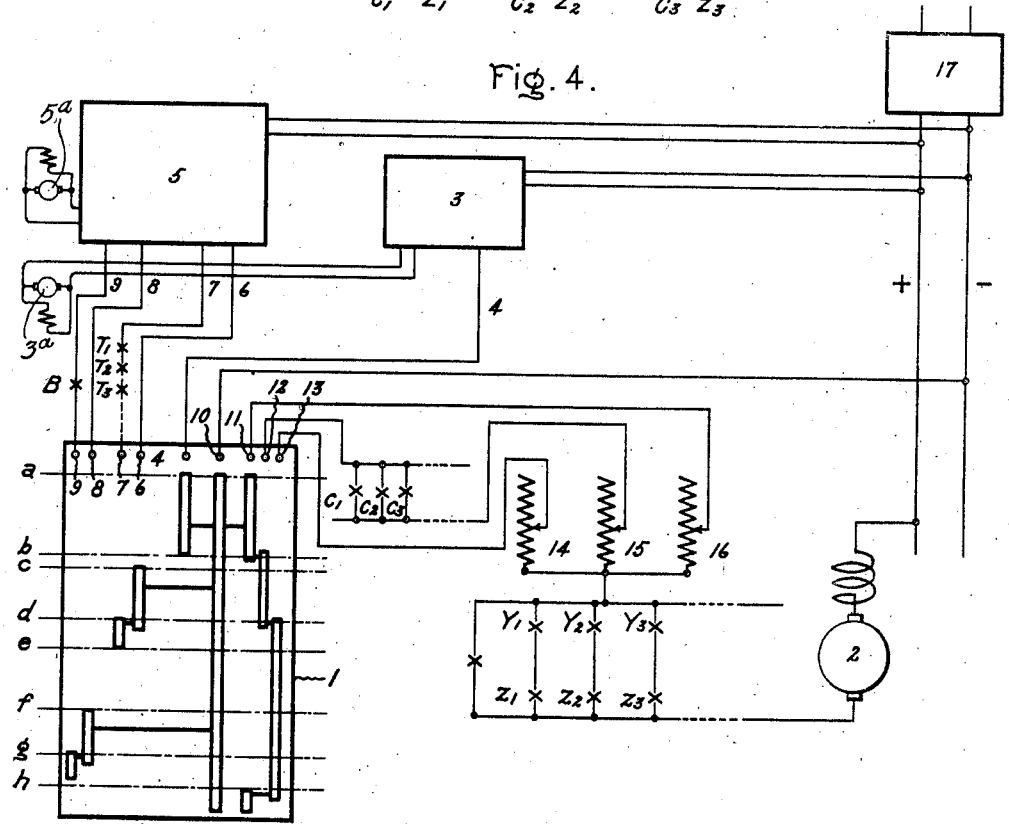
Fig. 4 is a diagram of connections for the scheme shown in Fig. 3.

Figs. 3 and 4 illustrate a second form of the invention, as applied to an automatic arrangement for filling railway wagons when run into sidings consisting of parallel tracks. The lettering and numbering of these diagrams are consistent as far as possible with that used in Figs. 1 and 2. The wagons are represented by 18, 19, 20 and are adapted to be filled with material taken from a hopper H. It is, of course, to be understood that any convenient number of wagons may be used. The skip S is mounted on a small buggy which in turn runs on an overhead runway situated across the whole width of the siding. The skip can be brought into a tipping position above any of the wagons which it is required to fill, and is pivoted so that it can tilt and empty its contents into the wagon immediately below. $C^1$, $C^2$, $C^3$ and $Z^1$, $Z^2$, $Z^3$ are switches on the tracks of the respective wagons 18, 19, 20, and are so arranged that when a wagon such as 19 is pushed into position, these switches are closed. B, X, $Y^1$, $Y^2$, $Y^3$, $T^1$, $T^2$, $T^3$ are limit switches on the overhead runway.

In operation, starting with the empty skip S in a position ready to be filled from the hopper H, power is supplied to the mains and the controller 1 is driven by means of the motor 2 until the control circuit 4 is completed by the position $a$ of the controller barrel reaching the contact fingers. Filling will then commence and continue while the controller barrel rotates until position $b$ reaches the contact fingers. The barrel continues to move a short distance until the circuit 11 is broken, and provided all the switches $C^1$, $C^2$ and $C^3$ are open, power is cut off from motor 2 and the controller is brought to a standstill.

If, now a wagon such as 19 is pushed on its track to a position beneath the runway, the corresponding switches such as $C^2$ and $Z^2$ are closed. The closure of any of the switches $C^1$, $C^2$, $C^3$ completes the circuit to motor 2 through contact finger 12, and the controller will recommence to rotate at a speed corresponding to the setting of rheostat 15. When the controller rotates so that position $c$ reaches the contact fingers, circuit 6 is completed, which causes the motor attached to the travel mechanism to commence running and the skip travels forward. On going forward, after a short time it will reach the limit switch X, which will be opened thereby (all other parallel circuits being already opened), and will thus stop the rotation of the controller. The skip will continue to move forward and will close switches $Y^1$, $Y^2$, $Y^3$ in passing, but these switches will not complete their respective circuits unless corresponding switches $Z^1$, $Z^2$, $Z^3$ are closed.

When the skip S reaches the track of a wagon such as 19 in which the switch such as $Z^2$ is closed, then on passing the corresponding switch $Y^2$ the motor 2 will commence to run, and the controller will recommence to rotate. The skip will continue to move forward until position $d$ of the controller reaches the contact fingers, when electric braking will commence. This will slow down the speed, and when the skip reaches the corresponding limit switch such as $T^2$, power is cut off and mechanical brakes applied to bring the skip to a standstill.

Mechanical arrangements are provided for tilting the skip when it moves forward over a wagon, so that the skip is in its tilted position when brought to a standstill. It will remain in this position whilst the controller is moving forward until position $f$ on the controller barrel reaches the contact fingers, when the travel motor will be started in the reverse direction and the skip will commence to return. On returning, it will first open the switch such as $Y^2$, corresponding to the track in question, thus bringing the controller to a standstill until the skip reaches switch X, when the controller will again commence to rotate, electric braking being introduced when position $g$ on the controller barrel reaches the contact fingers, and the skip is finally brought to rest by the limit switch B opening the control circuit 9, thus cutting off power from the travel motor and applying the mechanical brakes.

The cycle is then repeated, and the wagon will continue to be filled as long as it is in position under the runway. As soon as the wagon is pushed away, the operations will be discontinued as soon as the skip is filled and will recommence as soon as one of the wagons is pushed into position.

It is evident that although only two applications of the invention have been described, it may be used for any sequence of operations which involve definite motions being brought into play for various periods and require to be synchronized with the movements of such motions.

Not only do the arrangements insure the correct sequence of operations, being carried out and that, in the event of shut down, on recommencing the sequence is resumed from the same point, but it enables each of the time periods for the various operations to be adjusted independently of the others.

What we claim as new and desire to secure by Letters Patent of the United States, is:

1. An electric control system for a predetermined cycle of operations, comprising a plurality of separate operating motors, a master controller for the said motors, a pilot motor for operating the said controller, a plurality of limit switches for governing the said pilot motor and said operating motors depending on the operation of a portion of the operating motors, and electrical connections between the said motors and said controller through which the said motors are selectively controlled by the said controller and said limit switches to effect automatic repetition of a predetermined cycle of operations by operation of the said portion of the operating motors on a space basis and operation of another portion of the operating motors on a time basis.

2. An electric control system for a predetermined cycle of operations, comprising a plurality of separate operating motors, a master controller for the said motors, a pilot motor for operating the said controller, a plurality of limit switches for governing the said pilot motor and said operating motors depending on the operation of a portion of the operating motors, electrical connections between the said motors and said controller through which the said motors are selectively controlled by the said controller and said limit switches to effect automatic repetition of a predetermined cycle of operations by operation of the said portion of the operating motors on a space basis and operation of another portion of the operating motors on a time basis, and adjustable speed varying means for the said pilot motor under the control of said controller for independently governing the time intervals between the steps in the said cycle of operations which are performed on a time basis.

3. A control system for a skip hoist or the like comprising a bucket, a motor for governing the filling of the bucket, a motor for transporting the bucket from a filling position to an emptying position and back to the filling position, a master controller for governing the said motors, a pilot motor for operating the master controller, a plurality of limit switches operated in accordance with the movement of the bucket from one position to another position for governing the said pilot motor and said transporting motor, adjustable speed varying means for independently varying the speed of the said pilot motor between selected positions of said master controller, and electrical connections between the said motors and said controller through which the said motors are selectively controlled by said controller and said limit switches to effect an automatic repetition of a predetermined cycle of operations, which comprises filling the said bucket, transporting the same to a dumping position and then back to a filling position, the control of the filling motor being effected on a time basis by said controller and the control of the transporting motor and said pilot motor being effected in response to the position of said bucket.

In witness whereof, we have hereunto set our hands this sixteenth day of August, 1923.

RALPH DAVID GIVEN.
HUGH WILLIAM CONWAY LIDDIARD.